Jan. 20, 1953  E. M. DE COURSEY  2,626,032
CLUTCH WITH OVER CENTER SPRING LEVERS
Filed Aug. 4, 1948
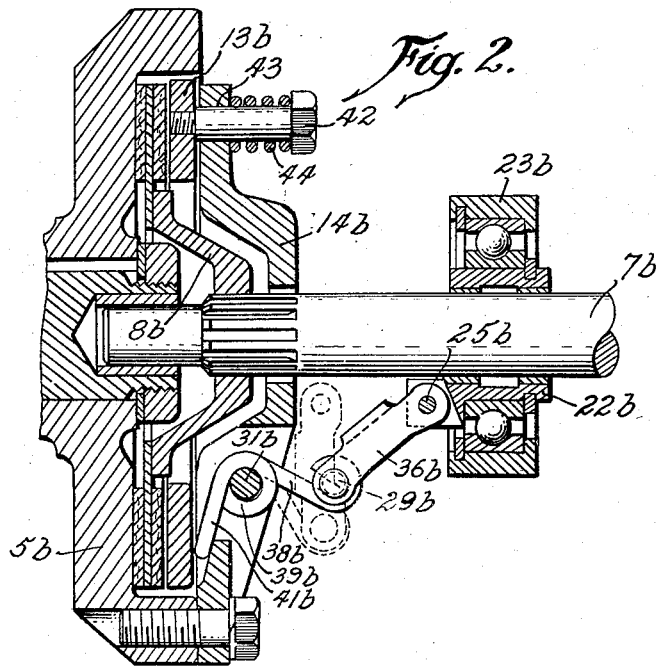
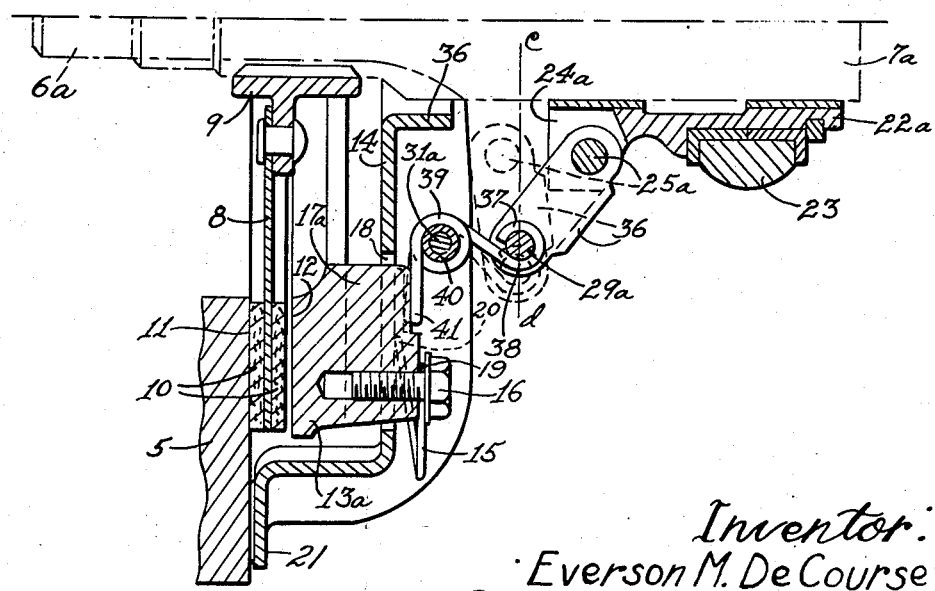
Inventor:
Everson M. De Coursey Patented Jan. 20, 1953

2,626,032

UNITED STATES PATENT OFFICE 2,626,032

CLUTCH WITH OVER CENTER SPRING LEVERS

Everson M. De Coursey, Auburn, Ind., assignor to Dana Corporation, Toledo, Ohio, a corporation of Virginia Application August 4, 1948, Serial No. 42,427

1 Claim. (Cl. 192—99)

This invention relates generally to friction clutch mechanisms, and is more particularly concerned with over-center type clutches suitable for use in tractors and, of course, also for other heavy duty purposes.

In over-center clutches of many designs, a small amount of wear on the clutch disk facings causes an appreciable drop in the engaging pressure with consequent excessive slippage and accelerated wear on the facings, all of which calls for frequent accurate adjustments by a specially skilled mechanic, unless, as pointed out in Miller and Thelander Patent No. 2,251,366, spring means of some suitable form is provided between the pressure plate and the over-center engaging means to compensate automatically for wear of the clutch disk facings and tend toward more uniform engaging pressure, clutches so equipped operating very satisfactorily with fairly coarse and not too frequent adjustments. Spring means of various kinds have been proposed heretofore for the purpose mentioned, but in most instances it has represented an added element or plurality of elements, adding, therefore, materially to the cost of production of these clutches and making the constructions less compact and more complicated, and often also more apt to get out of order and require frequent attention. It is, therefore, the principal object of my invention to provide clutch mechanisms of the so-called "constant pressure" type, in which the spring element or elements are incorporated in such a way as to serve both as the constant pressure spring means and as a motion transmitting means in the operation of the clutch, the same being an intermediate portion of the over-center means between the throw-out collar and pressure plate for moving the pressure plate away from the back plate in the engagement of the clutch, and vice versa. Thus, in the clutches herein disclosed, the over-center toggle linkage means comprises one link on the throw-out collar and a cooperating coiled torsion spring on the back plate as the other link element of each toggle, the spring means in these constructions, of course, serving the double purpose mentioned above.

The invention is illustrated in the accompanying drawing, in which—

Fig. 1 is a fragmentary section of a friction clutch embodying the improvements of my invention, namely, wherein a toggle link and a coiled torsion spring are used together in the manner described above, and Fig. 2 is a similar section of another clutch similar in design to that of Fig. 1, Similar reference numerals are applied to corresponding parts in these two views.

Referring to Fig. 1, there is illustrated a friction clutch, in which the reference numeral 5 designates a portion of the flywheel turning with the crankshaft of the engine in the usual way, and having the front end portion 6a of the driven shaft 7a piloted in the center thereof. 8 is the clutch disk, the center hub 9 of which is splined on the front end portion of the shaft 7a to transmit drive from the flywheel to the shaft when the clutch is engaged. The usual pads or facings 10 are provided on the clutch disk for engagement with the driving face 11 on the back of the flywheel and the companion driving face 12 on the front of the pressure plate 13a. The latter is suitably cast, like the flywheel, and the facings 11 and 12 are accurately machined on these cast parts to insure smooth clutch engagement. The back plate 14 is stamped from sheet metal to the dished form shown, whereby to enclose the clutch disk and pressure plate and allow room for the pressure plate to be retracted under the action of springs 15. These springs are fastened to the pressure plate by means of bolts 16 entered in drive lugs 17a projecting rearwardly from the pressure plate through holes 18 in the back plate, the springs being of W-shape, like those in Thelander Patent 2,214,780, and fastened by their middle portion 19 to the pressure plate and having the end portions 20 bearing against the back of the back plate, tending to urge the pressure plate rearwardly away from the flywheel. The pressure plate is shown in disengaged position in the drawing. The back plate is suitably secured to the rim of the flywheel by bolts entered through holes in the flanged peripheral portion 21, and the drive lugs 17a have the side faces thereof machined smooth to slide freely on the sides of the holes 18. In that way the pressure plate turns with the flywheel but is movable toward and away from the driving face 11 thereof for engagement and disengagement of the clutch.

The clutch is arranged to be engaged and disengaged in response to movement back and forth of the throw-out collar 22a, which is operable by means of a ring 23 provided with trunnions for cooperation with the usual yoke or clutch operating means. The collar 22 is slidable on the driven shaft 7a, and at three circumferentially spaced points, one hundred twenty degrees (120°) apart, is forked, as shown at 24a, and in each of these forked portions a cross-pin 25a is mounted for pivotal connection with one end of a toggle link 36. Each of these links is pivotally connected at its outer end, as at 29a, to the looped end 37 of one outwardly extending end portion or arm 38 of a coiled torsion spring 39, the coiled intermediate portion of which surrounds a bushing 40 bearing on a pivot pin 31a, while the other outwardly extending end 41 of the spring bears against the back of the adjacent drive lug 17a on the pressure plate 13a.

In operation, the clutch is engaged by forward movement of the collar 22a. The springs 39 are given their maximum deflection when the pivots 25a reach the dead-center plane c—d relative to pivots 29a, but the collar 22a moves farther forward until it strikes the edge of the annular flange 36 on the central portion of the back plate, and, hence, the springs 39 are made to serve the double purpose of supplying the clutch engaging pressure and at the same time holding the throw-out collar 22a in the forward limit position to keep the clutch engaged. The small extent to which the springs 39 are relaxed in moving forwardly past the dead-center plane c—d is not enough to make any difference so far as good clutch engagement is concerned, and there is, moreover, sufficient loading in the springs 39 in the engaged position so that wear on the clutch disk facings 10 will not be at all noticeable and will not seriously affect the operation of the clutch. In the disengagement of the clutch, the throw-out collar 22a is moved rearwardly away from the flywheel, and, obviously, as soon as the pivots 25a pass the dead-center plane c—d, the springs 39 recoil and assist in the return movement of the collar. When the collar is in the fully retracted position, shown in full lines in Fig. 1, the springs 39 are substantially fully unwound and, therefore, will not interfere with the springs 15 retracting the pressure plate 13. Each couple, spring 39 and link 36, form a toggle linkage, the spring 39 serving both as a toggle link and as a constant pressure wear-compensating spring.

In the clutch shown in Fig. 2, the pressure plate 13b is guided on and drivingly connected with the back plate 14b by means of bolts 42, which slide in holes 43 in the back plate and also serve as mountings for coiled compression springs 44 that are caged between the back plate and heads of the bolts and serve to return the pressure plate to retracted position. Otherwise this clutch is the same as that shown in Fig. 1, the coiled torsion springs 39b being pivotally mounted on the back plate, as at 31b, and having one end 41b bearing directly against the pressure plate while the other end 38b is pivotally connected, as at 29b, with the toggle link 36b. This link, in turn, is pivotally connected, as at 25b, with the throw-out collar 22b. There are three of these toggle link connections and three coiled torsion springs spaced circumferentially 120° apart. The other parts of the clutch which correspond to parts shown in Fig. 1 have been correspondingly marked. The operation of this clutch is obviously substantially the same as that shown in Fig. 1.

It is believed the foregoing description conveys a good understanding of the objects and advantages of my invention. The appended claims have been drawn to cover all legitimate modifications and adaptations.

I claim:

In a clutch, the combination of a pair of frictionally engageable driving and driven clutch members, a pressure plate member connected to turn with one of said clutch members and shiftable to cause driving engagement of said clutch members, and means for moving the pressure plate member to engaging position, comprising a throw-out collar and pivotally connected over-center clutch actuating toggle members, one of which is a link pivotally connected at one end to the throw-out collar and the other of which is a coiled torsion spring having outwardly extending end portions, one of which is pivotally connected to the other end of said link, the coiled middle portion of said spring being pivotally mounted on one of the clutch members and the other end portion of said spring being a pressure transmitting end portion engaging the pressure plate, said spring being flexed in the engagement of the clutch to hold the clutch members resiliently engaged.

EVERSON M. DE COURSEY.

REFERENCES CITED

The following references are of record in the file of this patent:

UNITED STATES PATENTS

| Number | Name | Date |
| --- | --- | --- |
| 461,929 | Crowell | Oct. 27, 1891 |
| 526,981 | Prawatke | Oct. 2, 1894 |
| 712,575 | McMahon | Nov. 4, 1902 |
| 1,861,080 | Chorlton | May 31, 1932 |
| 2,068,885 | Lyman et al. | Jan. 26, 1937 |
| 2,248,764 | Krenzke | July 8, 1941 |
| 2,280,870 | Thelander | Apr. 28, 1942 |
| 2,287,631 | Miller | June 23, 1942 |

FOREIGN PATENTS

| Number | Country | Date |
| --- | --- | --- |
| 29,333 | Great Britain | Dec. 19, 1913 |
| 189,544 | Great Britain | Dec. 1, 1922 |
| 294,171 | Germany | May 5, 1915 |